United States Patent [19]

Bovone

[11] Patent Number: 4,633,594
[45] Date of Patent: Jan. 6, 1987

[54] OPTICAL-PROBE CONTROL DEVICE FOR DRYING OVENS FOR MIRROR PROTECTIVE PAINT

[76] Inventor: Enrico Bovone, Corso Italia 53, 15076 Ovada (Alessandria), Italy

[21] Appl. No.: 792,982

[22] Filed: Oct. 30, 1985

[30] Foreign Application Priority Data

Nov. 9, 1984 [IT] Italy ................. 23510 A/84

[51] Int. Cl.⁴ .......................................... F26B 21/10
[52] U.S. Cl. ........................................... 34/48; 374/5
[58] Field of Search ............. 374/5, 33, 11; 34/209, 34/217, 48

[56] References Cited

U.S. PATENT DOCUMENTS

| | | | |
|---|---|---|---|
| 3,371,430 | 3/1968 | Bowman | 34/217 |
| 3,483,721 | 12/1961 | Apple et al. | 374/5 X |
| 3,504,524 | 4/1970 | Maley | 374/5 |
| 3,793,741 | 2/1974 | Smith, Jr. | 34/48 |
| 3,973,122 | 8/1976 | Goldberg | 374/4 X |
| 3,991,482 | 11/1976 | Brock et al. | 34/48 |
| 4,267,643 | 5/1981 | Haried | 34/48 |
| 4,304,118 | 12/1981 | Bartha et al. | 374/11 |

Primary Examiner—Daniel M. Yasich
Attorney, Agent, or Firm—Oblon, Fisher, Spivak, McClelland & Maier

[57] ABSTRACT

An infrared-sensitive optical probe disposed above the mirror (glass sheet) senses the paint temperature and provides an output to a circuit which, if necessary, adjusts the preset temperatures of the temperature controllers for the various sections of the drying oven along which the mirrors move.

3 Claims, 1 Drawing Figure

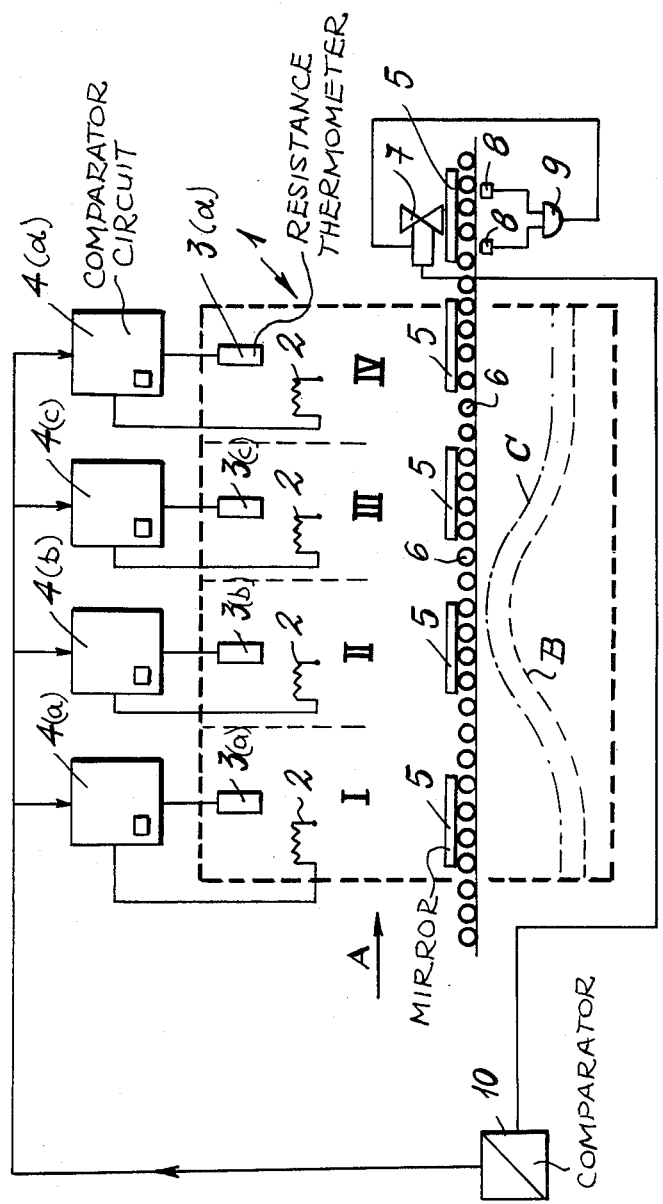

OPTICAL-PROBE CONTROL DEVICE FOR DRYING OVENS FOR MIRROR PROTECTIVE PAINT

BACKGROUND OF THE INVENTION

1. Field of the Invention

This invention relates to a temperature control device for drying ovens for mirror protective paint.

2. Discussion of Background

In mirror manufacture, the initial glass sheet, after suitable polishing, is coated on one face, in the stated order, with a layer of silver, a layer of copper and a layer of paint the purpose of which is to protect the underlying layers from environmental attack. In modern plants, the said operations are carried out on moving glass sheets with the plants operating continuously. After applying the various layers, the sheets, now converted into mirrors, pass through a continuous oven for drying the paint. These ovens have zones of different presettable temperatures so that an optimum temperature profile is obtained along the oven. The temperature of the various oven sections is set on conventional temperature control apparatus and is measured by resistance thermometers or thermocouples. The temperature measured is however the temperature of the environment in which the sheets lie, and not the sheet temperature or the temperature of the paint layer to be dried. Moreover, manual temperature setting based on experience does not have the merit of being sufficiently precise or responsive to effective requirements. If on the basis of experience a given temperature profile is used in the oven, it cannot be ensured that the temperatures used are those effectively necessary for implementing the required paint drying or that the paint will assume the temperature necessary for this (in this respect it should be noted that both the glass thickness and the paint thickness and viscosity affect the temperature acquired by the paint at the oven outlet, other conditions being equal).

SUMMARY OF THE INVENTION

The object of the present invention is to provide a temperature control system for drying ovens for mirror protective paint which is able to ensure that the mirror or rather the paint temperature at the oven outlet is adequate for requirements, ie for correct paint drying.

This and further objects which will be more apparent from the detailed description given hereinafter are attained by a device comprising presettable temperature control means which control heating elements disposed in the oven environment, said device being characterised essentially in that there is present at the oven outlet an optical probe under which the mirror passes, and the probe output, which is a function of the measured temperature, is compared in a comparator with a predetermined value or range in order to obtain a signal which is arranged to change the setting of the temperature control means.

BRIEF DESCRIPTION OF THE DRAWING

The invention will be more apparent from the detailed description of a preferred embodiment given hereinafter by way of non-limiting example and illustrated on the accompanying drawing, of which the single FIGURE shows a circuit diagram of the device according to the invention.

DETAILED DESCRIPTION OF THE PREFERRED EMBODIMENT

In the FIGURE, the reference numeral 1 diagrammatically represents a conventional oven which is heated electrically, for example by infrared lamps, resistance heaters or the like indicated by 2. These heating means, either individually or combined into groups, heat consecutive oven sections to different temperatures. In the example shown there are four sections I, II, III, IV which are autonomously heated to different temperatures. Each section possesses a resistance thermometer, thermocouple or the like 3 for measuring the temperature in the respective section and for transmitting it to its own comparator circuit (or temperature controllers) 4(a, b, c or d) on which a value equal to the required temperature has previously been set. The comparison between the measured value and the set value can produce a signal for controlling the heating element 2.

The glass sheets 5 provided with the metal and protective paint layers pass through the oven environment (in the direction of the arrow A) driven by a roller or cylinder table 6 operated by conventional motor means, not shown. In passing through the oven, the protective paint is dried. At the oven outlet, each sheet passes under an optical probe 7 sensitive to infrared rays, and enabled by an underlying pair of proximity sensors 8 which are suitably spaced apart and connected to the inputs of an AND gate 9. The optical probe 7 becomes enabled when both the proximity sensors 8 sense the presence of the sheets 5. By using this method, the optical probe 7 does not have to take readings during the gap between two consecutive sheets (in this respect, the sheets are spaced apart from each other).

The reading made by the optical probe 7 corresponds practically to the temperature effectively assumed by the paint layer. This reading is transformed into an electrical signal and reaches a comparator 10 on which a value has been set corresponding to the temperature which the paint has to effectively assume in order to attain the required degree of drying. If as a result of the comparison the comparator emits a signal, this latter is fed to the comparators 4 so as to change their setting. Thus this signal alters the value preset on the comparator circuits 4(a, b, c, d) in such a manner that they act on the heating elements 7 when the temperature sensors 3 sense a temperature different from that originally scheduled.

If the optical probe 7, after being enabled, indicates that the paint on the underlying sheet 5 is of lower temperature than is required (ie that set on the comparator 10), a modifying signal is fed to the comparator circuits. The modification made by this signal determines an equal increase in the reference value originally set on the comparator circuit 4(a, b, c, d) so that more heat is fed to the environment of the furnace 1 by means of the heating elements 2, and the subsequent sheets leaving the oven will all have their paint at the required temperature. By the effect of this adjustment, the temperature curve B along the oven becomes shifted upwards to C.

What is claimed is:

1. A temperature control device for continuous drying ovens for testing the dryness of protective paint on mirrors (glass sheets), comprising;
    moving means for moving said mirrors through an oven and beneath a plurality of drying means, each of said drying means having a different dryness temperature regulated by a regulated heating element, wherein said mirrors are mounted on said moving means;

presettable temperature control means which controls each of the heating elements disposed in the environment of the oven above the mirrors, through which the mirrors move;

at least one optical probe located at the outlet of said oven wherein mirrors pass under said probe, and the output of said probe, which is a function of the measured temperature, is fed to a comparator outside the oven and having a presettable input the output of said comparator regulates the setting of said temperature control means.

2. A device as claimed in claim 1, wherein the regulated heating elements provide an output temperature such that given a temperature curve is obtained for the measurements along the oven, wherein the regulated heating elements are regulated by the output of said comparator so as to obtain a substantial translation of said temperature curve.

3. A device as claimed in claim 1 further comprising proximity sensors located for detecting the presence of said mirrors wherein said proximity sensors are connected to an AND gate for enabling said optical probe when one of said mirrors is present.

* * * * *